(12) United States Patent
Pasternack et al.

(10) Patent No.: US 10,740,690 B2
(45) Date of Patent: Aug. 11, 2020

(54) AUTOMATICALLY TAGGING TOPICS IN POSTS DURING COMPOSITION THEREOF

(71) Applicant: Facebook, Inc., Menlo Park, CA (US)

(72) Inventors: Jeffrey William Pasternack, Belmont, CA (US); David Vickrey, Mountain View, CA (US); Justin MacLean Coughlin, Redwood City, CA (US); Prasoon Mishra, Mountain View, CA (US); Austen Norment McDonald, Sunnyvale, CA (US); Max Christian Eulenstein, San Francisco, CA (US); Jianfu Chen, Mountain View, CA (US); Kritarth Anand, Redwood City, CA (US); Polina Kuznetsova, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 718 days.

(21) Appl. No.: 15/469,399

(22) Filed: Mar. 24, 2017

(65) Prior Publication Data

US 2018/0276561 A1  Sep. 27, 2018

(51) Int. Cl.
| | | |
|---|---|---|
| *G06N 20/00* | (2019.01) | |
| *G06F 16/35* | (2019.01) | |
| *G06N 5/04* | (2006.01) | |
| *G06N 20/20* | (2019.01) | |

(52) U.S. Cl.
CPC ........... *G06N 20/00* (2019.01); *G06F 16/353* (2019.01); *G06N 5/041* (2013.01); *G06N 20/20* (2019.01)

(58) Field of Classification Search
CPC ........ G06N 20/00; G06N 5/041; G06N 20/20; G06F 16/353
See application file for complete search history.

(56) References Cited

U.S. PATENT DOCUMENTS

| | | | | |
|---|---|---|---|---|
| 6,772,120 | B1 * | 8/2004 | Moreno | G06F 17/2715 |
| | | | | 704/256 |
| 8,626,768 | B2 * | 1/2014 | Bailey | G06F 16/358 |
| | | | | 707/738 |
| 9,852,132 | B2 * | 12/2017 | Chhichhia | G06F 16/93 |
| 10,482,119 | B2 * | 11/2019 | Kataria | G06F 16/3322 |

(Continued)

*Primary Examiner* — Li B. Zhen
*Assistant Examiner* — Tewodros E Mengistu
(74) *Attorney, Agent, or Firm* — Fenwick & West LLP

(57) ABSTRACT

An online system predicts topics for content items. The online system provides one or more topic labels for a user to apply concurrently while a user is composing a post, in response to requests periodically received from the user's device. A request includes information such as content composed by the user and contextual information. The online system employs machine learning techniques to analyze content composed by a user and contextual information thereby to predict topic labels. Different machine learning models for classifying individual topic labels, identifying relevant topic labels, and/or detecting changes in existing topic predictions are developed. Some machine learning models predict topics for full content and some predict topics for partial content. The online system trains the machine learning models to ensure accurate topic predictions are provided timely. The online system employs various machine learning model training methods such as active training and gradient training.

22 Claims, 5 Drawing Sheets

(56) References Cited

U.S. PATENT DOCUMENTS

2016/0188567 A1\* 6/2016 Pasternack ............. G06N 7/005
 704/9
2016/0358099 A1\* 12/2016 Sturlaugson ........... G06N 20/00
2018/0144270 A1\* 5/2018 Wilson ................... G06N 5/022

\* cited by examiner

AUTOMATICALLY TAGGING TOPICS IN POSTS DURING COMPOSITION THEREOF

BACKGROUND

This description generally relates to identifying topics of content items, and particularly to developing and using machine learning models to predict topics of content items to be shared on an online system while they are being composed.

An online system allows its users to connect to and communicate with other users of the online system. Users may create user profiles on the online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for individuals or third parties to share different types of content.

A social networking system is one example of an online system that allows its users to post content to the social networking system for presentation to other social networking system users, allowing the users to interact with each other. Examples of content items include stories, photos, videos, and invitations. Additionally, the social networking system typically generates content items describing actions performed by users and identified by the social networking system. For example, a content item is generated when a user of a social networking system checks into a location, shares content posted by another user, or performs any other suitable interaction. The social networking system presents content items describing an action performed by a user to additional users connected to the user via the social networking system. Typically, the social networking system presents content items to users in a feed in an order based on times when content items are generated or received by the social networking system and also based on anticipated interest of the user in the content items.

Over time, users generate a large volume of content items that cover a variety of topics. For convenience, users often browse content items by topics. Tagging content items to topic tags promote their visibility to other users. Conventionally, topics tags are extracted from posts after the posts were submitted. However, users cannot update topic tags because the posts have already been published and possibly have been shared with others.

SUMMARY

An online system predicts topics of content items concurrently while users are composing the content items (e.g., posts to an online or social networking system) in a composer interface (or composer) of the online system. The online system provides a topic label associated with one or more of these predicted topics for users to apply, confirm, or edit while the users are creating the posts. In one embodiment, the predicted topics for a given post are obtained using a machine trained model.

In one example, while a user is composing a post in the composer of the online system, the composer sends requests periodically to the online system for topic labels. The requests include information such as the content that has been added to the composer by the user and contextual information. The content and the contextual information together provide a basis for the online system to predict topic labels that may be relevant. The online system analyzes the content and contextual information to identify relevant topic labels and provide the identified topic labels to the composer.

The contextual information describes information about a content item being created in the composer that may be used to predict topics in the content. For example, the contextual information may include user information such as the user's identity, current location, interests, associated groups, etc.; metadata about the content, such as a character or word count, a composing order, topic labels that have been determined, topic labels that have been applied or removed, and the like; historical user actions, such as interactions with topics (e.g., adding or removing topic labels), incorporating (e.g., copying and pasting) content from another source; composer information such as if the user is composing in a group, if a user is composing in a comment, etc.; and metadata of content from another source that is included in the post such as a picture, another user's post, URL, and the like.

The online system employs machine learning techniques to analyze the content composed by a user using the contextual information thereby to predict topic labels for the content. For example, the machine learning models are trained based on historical correlations of topic labels with content and contextual information. Machine learning models may include ensemble classifiers that receive contextual information as well as content of a post and that output topic labels that are relevant to the post. In some embodiments, the topic labels are selected from a plurality of predetermined topic labels. For each predetermined topic label, the online system develops a machine learning model such as a binary classifier that outputs either positive or negative classification indicating whether the topic label is relevant.

In some embodiments, the online system uses machine learning models to predict topic labels for different composition stages. A composition stage is a stage in a process of developing a complete post and can reflect a degree of completeness of the post. For different composition stages, the machine learning models output topic label predictions that are associated with different confidence levels. Topic labels predicted for later-composition stages are associated with higher confidence values because more information is available for generating the topic labels. A composition stage can be determined, for example, by an amount of content that has been composed, a type of content that has been added, and/or an order of different types of content. The online system selects one or more machine learning models that are applicable for predicting topic labels for a particular composition stage.

In some embodiments, to reduce system load, the online system applies machine learning models or rules to detect whether existing topic predictions will change. That is, a machine learning model or rule determines as to whether machine learning models for predicting topic labels will output different topic predictions than the existing topic predictions. For example, the online system analyzes newly generated content and contextual information such as topic information of a content item to make the determination. The online system applies machine learning models for predicting topic labels only if the online system determines that there is a high likelihood that exiting topics predictions will change.

The online system uses training data such as posts that are annotated with topic labels to create machine learning models. The posts included in the training data may be complete or partial posts so that the machine learning models can determine topic labels from incomplete or complete posts. When training machine learning models, the online system determines confidence score thresholds to prevent output topic predictions from toggling between negative and positive or from toggling between different topic labels, and also to output topic labels timely. In some embodiments, the online system employs active training. For example, the online system identifies output predictions associated with certain confidence levels (e.g., 50%) and corresponding input content and contextual information. The online system provides the identified input to experts for annotation thereby to improve machine learning models. In some embodiments, the online system optimizes machine learning models. For example, the online system examines models' output gradient caused by changes in input. The online system identifies input content and contextual information, if labeled, would cause a machine learning model's output to change the most. The online system provides the identified input to experts for annotation thereby to improve the machine learning model.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
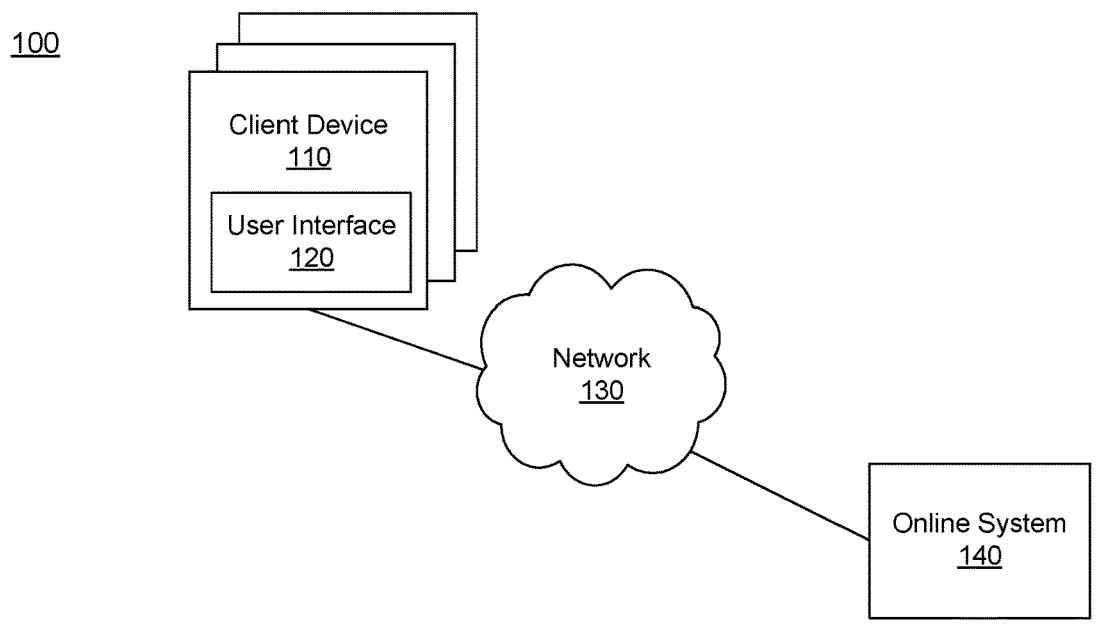
FIG. 1 is a diagram of a system environment for providing and ranking content items according to one embodiment.

FIG. 1 is a diagram of a system environment 100 for ranking topics and presenting content items according to the ranked topics according to one embodiment. The system architecture includes one or more client devices 110 connected to an online system 140 via a network 130. In other embodiments, different and/or additional entities can be included in the system environment 100.

The client device 110 is a computing device capable of receiving user input as well as transmitting and/or receiving data via the network 130. A client device 110 is a device having computer functionality, such as a smartphone, personal digital assistant (PDA), a mobile telephone, or another suitable device. A client device 110 is configured to communicate via the network 130. In one embodiment, a client device 110 executes an application allowing a user of the client device 110 to interact with the online system 140. For example, a client device 110 executes a browser application to enable interaction between the client device 110 and the online system 140 via the network 130. In another embodiment, a client device 110 interacts with the online system 140 through an application programming interface (API) running on a native operating system of the client device 110, such as IOS® or ANDROID™. The client device 110 also includes a user interface 120 that allows a user to interact with the client device 110. Via the user interface 120, a user can further interact with the online system 140. The client device 110 can execute an application associated with the online system 140 and present the user interface 120 based on information received from the online system 140.

The network 130 includes any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (Wi-MAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

The online system 140 includes a computing environment that allows users of the online system 140 to communicate or otherwise interact with each other and access content. The online system 140 determines topics for content items concurrently when users compose the content items. The online system 140 receives content of a content item while it is being composed by users. In addition, the online system 140 also receives requests for topics from composer interfaces. The online system 140 analyzes the content that has been composed and contextual information associated with the content to predict topics of the entire content item. Content items include information from the online system 140, e.g., stored user profile information, user action information, or information from objects in general stored on the online system 140. Content items may also include sponsored content provided by a third party outside of the online system 140. Content items can include any combination of text, different types of media (e.g., images and videos), or universal resource locators (URL). In an embodiment, the online system 140 provides topic labels for users to select to apply to a content item.

The online system employs machine learning techniques to analyze content composed by a user and contextual information thereby to predict topic labels. A topic label corresponds to one or more topic(s) and is used to identify topics of content items. When applied to a content item, a topic label indicates that the particular content item is related to the topic(s). In some embodiment, the topic labels are selected from a plurality of predetermined topic labels. For each predetermined topic label, the online system develops a machine learning model such as a binary classifier that outputs either positive or negative classification indicating whether the topic label is relevant. In some embodiments, the online system creates machine learning models for predicting topic labels for different composition stages. In some embodiments, to reduce system load, the online system applies machine learning models or rules to detect whether existing topic predictions are likely to change. The online system applies machine learning models for predicting topic labels only if existing topic predictions are likely to change.

Online System

Figure 2:
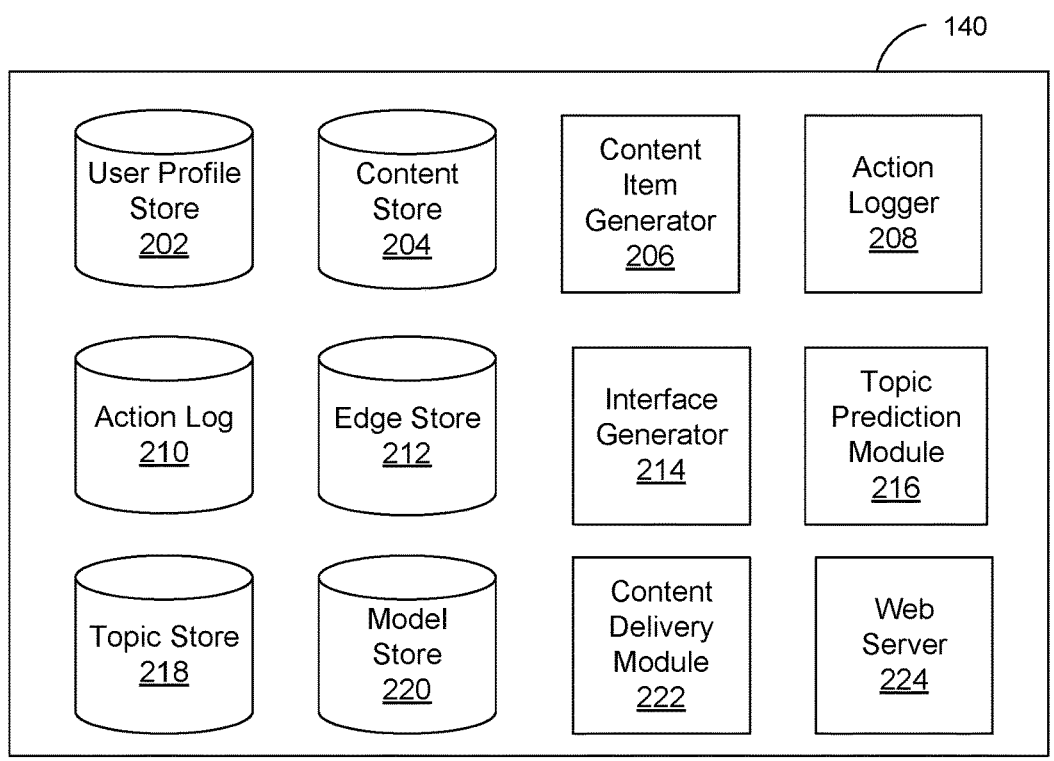
FIG. 2 is a block diagram of a system architecture of an online system according to one embodiment.

FIG. 2 is a block diagram of a system architecture of the online system 140 according to one embodiment. The online system 140 includes a user profile store 202, a content store 204, a content item generator 206, an action logger 208, an action log 210, an edge store 212, an interface generator 214, a topic prediction module 216, a topic store 218, a machine learning model store (also referred to as model store) 220, a content delivery module 222, and a web server 224. In other embodiments, the online system 140 includes additional, fewer, or different components for various applications. In an embodiment, the online system is a social networking system that allows users to establish connections with other users and interact with the other users. Such online system provides content items to a user as news feed describing actions performed by other users connected to the user. Conventional components such as network interfaces, security functions, load balancers, failover servers, management and network operations consoles, and the like are not shown so as to not obscure the details of the system architecture.

The user profile store 202 stores user profiles associated with each user of the online system 140. A user profile includes declarative information about the user that was explicitly provided by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as associated groups, work experience, educational history, gender, hobbies or preferences, location and the like.

A user profile may also store other information provided by the user, for example, images or videos. In certain embodiments, images of users may be tagged with identification information of users of the online system 140 displayed in an image. A user profile in the user profile store 202 may also maintain references to actions by the corresponding user performed on the online system 140. The user profile store 202 further stores data describing one or more relationships between different users and allows users to specify their relationships with other users, e.g., the user's connections. For example, these user-defined relationships allow users to generate relationships with other users that parallel the user's real-life relationships, such as friends, co-workers, partners, and the like.

The content store 204 stores objects that each represent various types of content. Examples of content represented by an object include a page post, a status update, a photograph, a video, a link, a shared content item, a gaming application achievement, a check-in event at a local business, a brand page, or any other type of content. In one embodiment, objects in the content store 204 represent single pieces of content, or content "items." Hence, users of the online system 140 are encouraged to communicate with each other by posting text and content items of various types of media to the online system 140 through various communication channels. This increases the amount of interaction of users with each other and increases the frequency with which users interact within the online system 140.

The content item generator 206 generates content items for presentation to users of the online system 140. The content item generator 206 can analyze information stored in the user profile store 202 or in the action log 210 to identify information useful for generating content items. Based on the analyzed information, the content item generator 206 generates content items for users. For example, in response to users' requests to create content items such as status updates, photos tagged by users to be associated with other objects in the social networking system, events, groups or applications, the content item generator 206 generates the content items as requested by the users. The content item generator 206 may also receive content items from external systems such as third-party applications separate from the online system 140. The content item generator 206 stores the generated content items in the content store 204.

In some embodiments, the content item generator 206 determines one or more topics associated with objects in the content store 204. The content item generator 206 may receive topic labels provided by users of the online system 140 or analyze content of the content items to determine the topics. When creating a content item, a user of the online system 140 can associate the content item with one or more topic labels identifying the topic(s) associated with the content item. The content item generator 206 may also identify anchor terms included in a content item and determines a meaning of the anchor terms as further described in U.S. application Ser. No. 13/167,701, filed Jun. 24, 2011, which is hereby incorporated by reference in its entirety. The content item generator 206 may also use structured information associated with a content item to extract a topic associated with the content item. For a particular content item, the content item generator 206 associates the determined topics(s) with an object identifier corresponding to the content item and stores the determined topic(s). Associations between object identifiers and topics (e.g., topics stored in the topic store 218) are stored in the content store 204 to simplify retrieval of one or more topics associated with an object identifier or retrieval of object identifiers associated with a specified topic.

The action logger 208 receives communications about user actions internal to and/or external to the online system 140, populating the action log 210 with information about user actions. Examples of actions include adding a connection to another user, sending a message to another user, uploading an image, reading a message from another user, viewing content associated with another user, or attending an event posted by another user. In addition, a number of actions may involve an object and one or more particular users, so these actions are associated with those users as well and stored in the action log 210.

The action log 210 may be used by the online system 140 to track user actions on the online system 140, as well as actions on third party systems that communicate information to the online system 140. Users may interact with various objects on the online system 140, and the action logger 208 stores information describing these interactions in the action log 210. Examples of interactions with objects include: composing posts, posting posts, applying topic labels to posts, commenting on posts, sharing links, and checking-in to physical locations via a client device, accessing content items, and any other interactions. Additional examples of interactions with objects on the online system 140 that are stored in the action log 210 include: posting a photo album, commenting on a photo album, communicating with a user, establishing a connection with an object, joining an event to a calendar, joining a group, creating an event, authorizing an application, using an application, expressing a preference for an object ("liking" the object) and engaging in a transaction.

Additionally, the action log 210 may record a user's interactions with sponsored content on the online system 140 as well as with other applications operating on the online system 140 if the online system 140 has been granted access. In some embodiments, data from the action log 210 is used to infer interests or preferences of a user, augmenting the interests included in the user's user profile and allowing a more complete understanding of user preferences and types of content items that the user would likely to interact with. The action log 210 can record information about client devices 110 that users use to interact with the online system 140. For example, the action log 210 records whether the user used a laptop computer or smartphone to interact with the online system 140. Further, the action log 210 may include information about the types of client devices 110, e.g., smartphone running an IOS® or ANDROID™ operating system.

The action log 210 may also store user actions taken on third party systems, such as an external website, and communicated to the online system 140. For example, the external website may recognize a user of the online system 140 through a social plug-in enabling the external website to identify the user of the online system 140. Since users of the online system 140 are uniquely identifiable, external websites may communicate information about a user's actions outside of the online system 140 to the online system 140 for association with the user. Hence, the action log 210 can record information about actions that users perform on a third party system including webpage viewing histories, sponsored content that were engaged, purchases made, and other patterns from shopping and buying.

The edge store 212 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, interest, or other user in the online system 140 based on the actions performed by the user. Multiple interactions between a user and a specific object may be stored as a single edge in the edge store 212, in one embodiment. Alternatively, each interaction between a user and a specific object is stored as a separate edge. In some embodiments, connections between users may be stored in the user profile store 202, or the user profile store 202 may access the edge store 212 to determine connections between users.

In one embodiment, the edge store 212 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, a rate at which the user interacts with content items related to a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

Example features describing a content item include a topic of the content item (e.g., a topic related to sports, food, travel, or entertainment), a type of media included in the content item (e.g., a photo of a beach or a video of a concert), users associated with the content item (e.g., which user posted the content item or which user was tagged in the content item), or the popularity of the content item (e.g., based on a number of likes or comments received by users). Example features describing a user include a topic of content items that the user frequently interacts with (e.g., the user frequently interacts with content items about basketball, baseball, or football because the user is a sports fan), a type of media included in content items that the user frequently views (e.g., videos of movie trailers or cooking tutorials), or user profile information of the user (e.g., the user's demographic information or brand pages that the user has liked).

The interface generator 214 processes data from other components of social networking system 140 and generates an interface that is communicated to the client device 110. For example, the composer interface is communicated to the application of the online system 140 or the browser application that is executing on the client device 110. Users of the online system 140 view information from the online system 140 and provide information to online system 140 via one or more interfaces generated by the interface generator 214. For example, information describing content presented by an interface and accessed by a user is communicated to the online system 140, allowing the online system 140 to maintain a record of content with which the user interacted. In one embodiment, the interface generator 214 determines the interactions between the client device 110 and users via the interface and processes the interactions into formats used by other components of the online system 140.

In one embodiment, the interface generator 214 generates a composer interface for receiving data describing content from a user for distribution to client devices associated with users of the online system 140. The composer interface may be presented on the client device 110. When a user provides text and other media content for communicating to the online system 140, such as content for posts, content for comments, entering search parameters, completing data forms and the like, the interface generator 214 presents the user with a composer interface for entering text and/or other input. For example, a user may access the composer interface by interacting with another interface presented by the online system 140, causing the interface generator 214 to present the composer interface. In one embodiment, the composer interface is a text entry region, such as a text box, and other composition-related icons and functions. Input received via the composer interface is communicated to the online system 140, which stores the received input.

The interface generator 214 and/or the composer interface collectively determine contextual information that describes the context of a content item that is being composed. In some embodiments, the interface generator 214 determines and provides contextual information to the composer interface. As described herein, contextual information includes user information, user actions, content information, composer information, and other information that describes the context of a user composing content. The interface generator 214 analyzes the received content to determine contextual information such as a character or word count, a composing order (e.g., an order of different types of content), information of content such as a type (e.g., text, image, video, audio, etc.), metadata (e.g., author, publish date, topics, location, source, objects included (e.g., twin peaks, dogs, food, etc.), etc.), topic labels that have been applied or removed, topic labels that have been previously determined, and the like.

The interface generator 214 also analyzes the composer interface to determine contextual information, such as where the composer is located (e.g., in a feed, in a specific group, in a timeline, in a comment, etc.) If content input by the user includes content of another source, the interface generator 214 further analyzes the content from the other source to identify associated metadata and includes the associated metadata in the contextual information. The interface generator 214 and/or the composer can retrieve contextual information such as user information associated with the user providing the input from one or more of the user profile store 202, content store 204, action log 210, and edge store 212. The composer itself may also determine contextual information, such as user information such as a location of the client device 110, the user's identity, interests, associated groups; composer information such as where the composer is located, user actions such as adding or removing a topic label, uploading a picture, including content from another source, content information such as a word or character count, metadata of content from another source, a composing order, topic labels that have been presented to the user, topic labels that have been added or removed by the user; user actions; and other contextual information.

The topic prediction module 216 predicts one or more topics associated with content concurrently while a user is composing the content. Periodically, the topic prediction module 216 receives requests for topics from a composer interface. In response to receiving a request, the topic prediction module 216 predicts topic(s) of the content item being composed by the user. For example, fitness, health, politics, news, pets, music, etc. are examples of topics. When predicting topics, the topic prediction module 216 uses information included in a request that is received. A request for topics includes information such as content input by a user and contextual information of a content item. "A request for topics" is also referred to herein as "a request for topic labels" or "a request for topic predictions." A request includes full and/or partial content. As described herein, "full content" refers to all content of a content item that has been input by a user when a composer interface sends a request for topics, and "partial content" refers to update on content of a content item since the composer interface sent the most recent request for topics. The topic prediction module 216 may retrieve additional contextual information such as user information, content information such as metadata associated with content from another source (e.g., other users who have shared the same content and associated user information, author of that content and associated user information, etc.) from one or more of the user profile store 202, content store 204, action log 210, and edge store 212.

In one embodiment, the topic prediction module 216 receives requests for topics periodically (e.g., every 1.5 seconds). In one embodiment, when a composer interface detects that a user adds or removes a topic label, the composer interface pauses sending requests for topics to the online system 140. The composer interface resumes sending requests for topics if the user continues composing content.

The topic prediction module 216 provides the determined topic(s) to the client device 110 for presentation to the user. In some embodiments, the topic prediction module 216 provides topic labels suggestions that can be used to tag content items. From the topic labels provided the user, a user can select to tag a content item with at least one topic labels. A user can choose not to tag a content item with any topic labels. A user can also create topic labels to tag content items. When a content item is tagged with a particular topic label, the content item can be located by the topic label or topic(s) corresponding to the topic label. The content item can also be presented in a topic-based feed for presenting content items related to that topic. For example, a content item tagged with the "fitness & health" topic label can be located by other users by the topic label "fitness & health" or topics such as fitness, health, or work out. The topic content item can also be presented along with other content items tagged with "fitness & health" in a topic-feed for "fitness & health." The topics provided to the user may update over time as a user progresses in composing a content item and new content is developed.

The topic prediction module 216 selects topics from predetermined topics (e.g., topics stored in the topic store 218) that are relevant to a content item being composed. To select topics, the topic prediction module 216 provides content received in a request and contextual information associated with the content item to one or more machine learning models. The contextual information associated with the content item includes contextual information received in the request and may additionally include contextual information retrieved from other modules of the online system. A machine learning model receives the content as well as contextual information and outputs one or more topics that are likely to be relevant to the content item. A machine learning model can predict topics for requests that include full and/or partial content. The topic prediction module 216 can select one or more machine learning models from the machine learning models stored in the model store 220. This selection is based on the content included in the request. For example, if a request includes full content, the topic prediction module 216 selects machine learning models that are suitable for predicting topics for full content. Conversely, if a request includes partial content, the topic prediction module 216 selects machine learning models suitable for predicting topics for partial content.

Furthermore, a machine learning model can predict topics for content items of different composition stages. The topic prediction module 216 selects one or more machine learning models that are suitable for predicting topics for a particular composition stage. In various embodiments, a composition stage can be determined based on a composing time period, a word count, a composition order, and the like.

A machine learning model may include an ensemble classifier (e.g., a GBT (gradient-boosted tree)) that is an ensemble of individual classifiers. Each individual classifier corresponds to a particular topic and outputs a classification of a likelihood of the particular topic being relevant to the content that the user is composing. In some embodiments, an individual classifier is a binary classifier that outputs a classification that is either positive or negative. The positive classification indicates that a particular topic is relevant and the negative classification indicates that the particular topic is irrelevant. For example, an individual classifier classifies a request into a positive or negative classification given information such as content and contextual information. A classifier associates an output classification with a confidence score that is a numerical value reflecting a degree of accuracy of the classification. The confidence score can be used to indicate a likelihood of a particular topic being relevant or irrelevant to a content item. The ensemble classifier outputs a set of relevant topics that are classified as positive and associated with confidence scores greater than a threshold. Alternatively, the ensemble classifier outputs a set of topics with corresponding classifications and associated confidence scores. An ensemble classifier and the individual classifiers included in the ensemble classifier can classify full and/or partial content.

An ensemble classifier associates its output classification with a confidence score that is a numerical value reflecting a degree of accuracy of the classification. The confidence score can be used to indicate a likelihood of a particular topic being relevant or irrelevant to a content item. The ensemble classifier's output topic classification is a weighted topic prediction of the individual classifiers' output classifications. Different individual classifiers are associated with different weights. The ensemble classifier's output topic classification may be a weighted sum of the individual classifiers' output classifications with associated confidence scores. In some embodiments, the ensemble classifier selects to output topics that are positively classified and associated with confidence scores greater than a threshold. Alternatively, the ensemble classifier outputs topics with associated classifications and confidence scores.

The topic prediction module 216 selects topics that are associated with confidence scores greater than a threshold score as topic predictions for a content item being composed by a user. Different threshold scores can be used for different topics. For a particular topic, the topic prediction module 216 can determine a threshold score from a score function. The score function defines a relationship between threshold scores and one or more factors, such as a composition stage that can be determined based on at least one of a word count, a character count, time spent on composing, and the like. By using different threshold scores, the topic prediction module 216 helps to arrive at the correct predicted topic quickly while avoiding flipping between different topics before the correct one is reached. For example, for earlier composition stages, the output topic predictions may be associated with lower confidence scores since less content has been composed. The topic prediction module 216 accordingly uses lower threshold scores during earlier composition stages. Conversely, the topic prediction module 216 uses higher threshold scores during later composition stages. As further explained below, the topic prediction module 216 may train a score function that defines different thresholds for various topics. If multiple topics are determined as relevant to content composed by a user, the topic prediction module 216 ranks the topics based on the associated confidence scores and provides them to the client device 110 in an order as ranked. The client device 110 presents the topic predictions in the order as ranked.

Figure 3A:
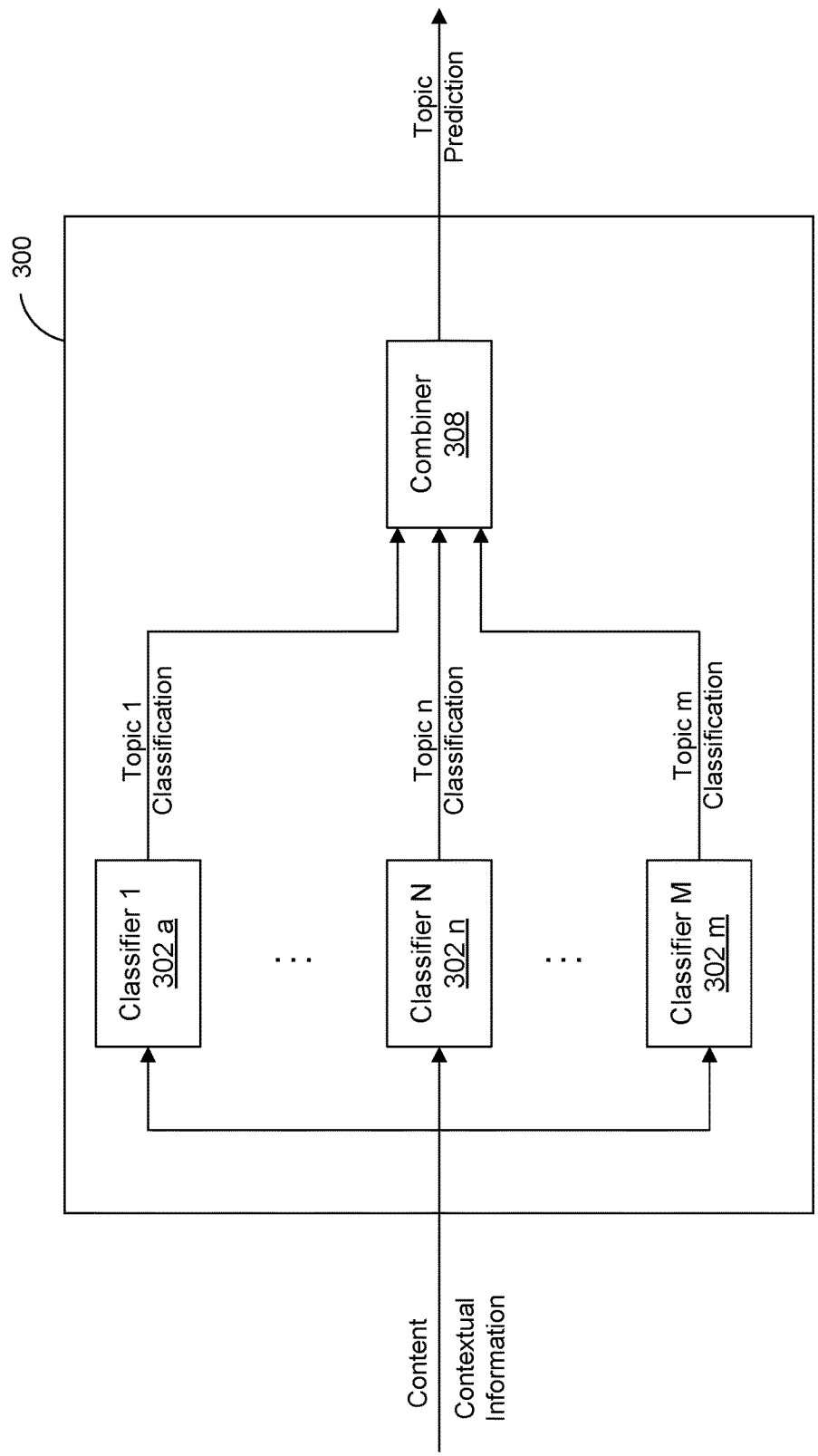
FIG. 3A illustrates an example ensemble classifier according to one embodiment.

Referring to FIG. 3A, an example ensemble classifier 300 includes a set of classifiers 302 a-m (hereinafter referred to collectively as classifiers 302). The ensemble classifier 300 receives input that includes content received in a request as well as contextual information, and outputs a topic prediction for a content item being composed by a user in a composer. The topic prediction includes a set of topics relevant to the content item. Each of the classifiers 302 is a binary classifier and corresponds to a particular topic. Each of the classifiers 302 receives the input and outputs a classification of whether a particular topic is relevant. The combiner 308 combines the classifiers' 302 classifications into the output topic prediction.

Referring back to FIG. 2, the one or more classifiers observe correlations between likelihood of topics being relevant or irrelevant to content as well as contextual information as described above. For example, an individual classifier observes one or more correlations such as a correlation of a topic being relevant to content such as a word, multiple words in a particular order, a picture, a URL, different types of content in a particular order, a correlation of a topic being irrelevant to users that have particular user information, a correlation of a topic being relevant to users that have performed certain user actions, a correlation of a topic being relevant to composers that have particular composer information, or a correlation of a topic being relevant to other topics. The topic prediction module 216 associates different weights with various features to indicate strength of correlations between different features and topics. The topic prediction module 216 trains the one or more classifiers using training data as further described below.

In some embodiments, the one or more machine learning models include a machine learning model for determining whether existing topic predictions will change. For example, a machine learning model detects whether an existing topic prediction for a content item will likely change given content update and contextual information received. As one example, a machine learning model determines whether existing topic labels are still relevant. The existing topic labels include topic labels that have been determined by the online system 140 and are included in contextual information. Upon receiving a request, the topic prediction module 216 detects whether an existing topic prediction is likely to change before determining topics for the content item. If it is likely that an existing topic prediction will change, the topic prediction module 216 invokes one or more machine learning models for predicting topics. Because determining whether existing topic predictions will change is often less compute-intensive and/or data-intensive than predicting topics, predicting topics only when existing topic predictions are likely to change reduces the system load of the online system 140.

Figure 3B:
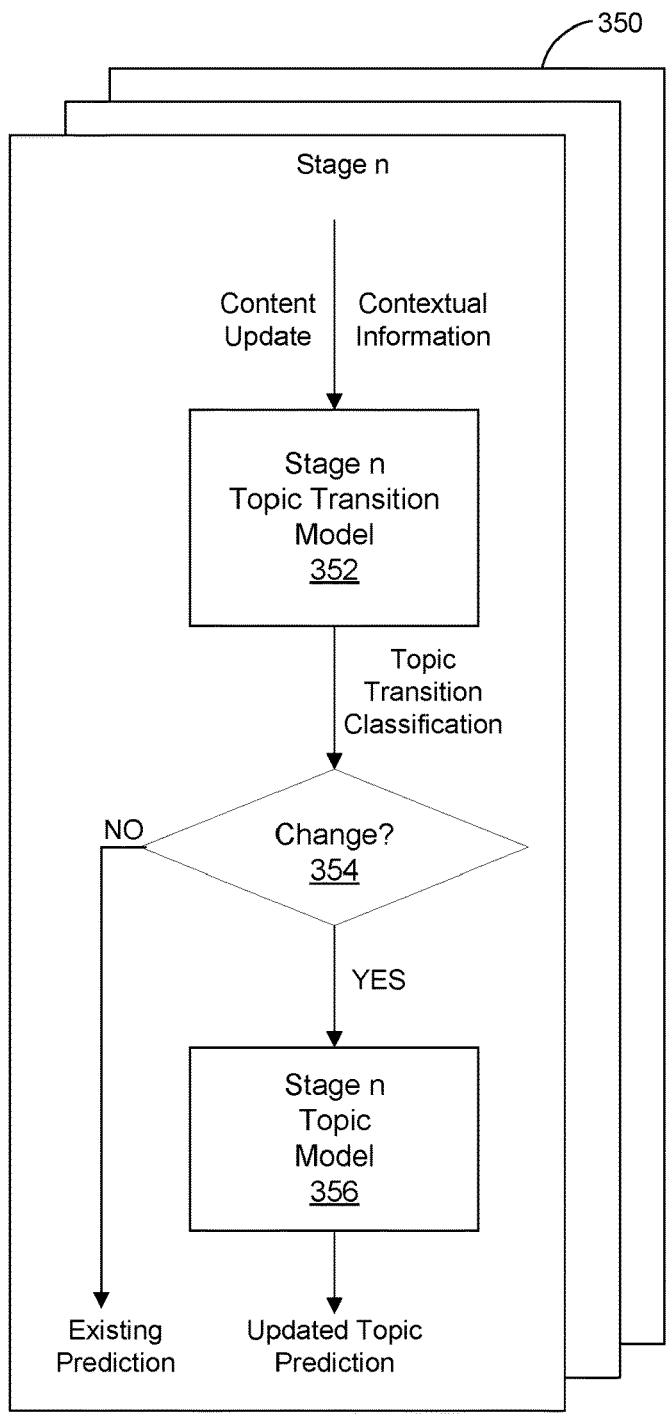
FIG. 3B illustrates an example process of predicting topics for a particular composition according to one embodiment.

Referring now to FIG. 3B, an example process of predicting topics for a particular composition stage is illustrated. The composer interface and/or the topic prediction module 216 may determine composition stages based on one or more factors such as a composition time period, a word/character count, and an composition order of different types of content such as text, photos, videos, URL, etc. For example, the composer interface and/or the topic prediction module 216 compare an amount of time that the user has spent on composing a content item, a word/character count of the content, and/or an composition order of the content item to a corresponding threshold to identify a composition stage for this particular user.

After a composition stage has been determined, when receiving a request for topics, the topic prediction module 216 provides content and contextual information to a machine learning model 352 for detecting whether existing topic predictions will change. The contextual information includes an existing topic prediction (e.g., topic labels that the online system 140 determined as relevant). As illustrated, the machine learning model 352 for detecting whether existing topic predictions will change corresponds to a particular composition stage. The topic prediction module 216 selects the machine learning model 352 for detecting whether existing topic predictions will change based on the determined composition stage. Different machine learning models for detecting whether existing topic predictions will change are developed for different composition stages. In other embodiments, one machine learning model is used for detecting whether existing topic predictions will change for different composition stages. If an existing topic prediction is determined to change, the topic prediction module 216 provides the input content and contextual information to a machine learning model 356 for predicting topics. As illustrated, the machine learning model 356 for predicting topics corresponds to a particular composition stage. The topic prediction module 216 selects the machine learning model 352 based on the determined composition stage. Different machine learning models for predicting topics are developed for predicting topics for different composition stages. In other embodiments, one machine learning model is used for predicting topics for different composition stages. The machine learning model 356 for predicting topics can include an ensemble classifier such as the example classifier 300 descried in connection with FIG. 3A. The topic prediction module 216 provides the output topic predictions of the machine learning model 356 or the existing topic prediction to the client device 110.

Referring back to FIG. 2, the topic prediction module 216 may train the machine learning models such as individual topic classifiers, ensemble classifiers, or machine learning models for detecting whether existing topic predictions will change using training data. The training data includes content items for which topics have been identified and associated contextual information, and/or content items for which existing topic predictions are determined to change. The content items may be labeled by experts. The training data includes content items that include full or partial content. The training data can be retrieved from the user profile store 202, the content store 204, the action log 210, and/or be provided by an expert to the online system 140. The training process provides various machine learning models for classifying individual topics, for predicting topics, and for detecting whether existing topic predictions will change with the training data. Since user data is constantly updating and new training data becomes available, the topic prediction module 216 can periodically retrain the one or more classifiers using updated training data.

The topic prediction module 216 also extracts features from training data such as content items and contextual information that are of different characteristics and creating a feature vector. Dimensionality reduction (e.g., via linear discriminant analysis, principle component analysis, etc.) may be used to reduce the amount of data in the feature vector to a smaller, more representative core set of features. Machine learning algorithms can be used such as support vector machines (SVMs), boosting for other algorithms (e.g., AdaBoost), neural net, logistic regression, naïve Bayes, memory-based learning, random forests, bagged trees, decision trees, boosted trees, gradient-boosted trees, boosted stumps, ensemble learning, etc. The accuracy of the trained machine learning models for classifying individual topics, for predicting topic prediction models, and for detecting whether existing topic predictions will change is evaluated using a validation set that was formed as a disjoint set of the data for testing the trained machine learning models to ensure that the trained machine learning models generalize to non-training data. Common metrics applied in accuracy measurement include precision and recall may also be used to update various machine learning models. For example, an accuracy measure that unifies the precision and recall can be used by the topic prediction module 216 to reject or iterate on the model as needed.

The topic prediction module 216 further trains a score function that defines different thresholds for various topics. The thresholds are used to evaluate whether topics that are classified as positive are relevant. After a training of various machine learning models for classifying individual topics, for predicting topics, or for detecting whether existing topic predictions will change completes, the topic prediction module 216 provides training data such as content items of which topics have been identified (e.g., labeled by experts) and their associated contextual information to trained models. Content items may be provided to simulate users composing content items. For example, the topic prediction module 216 divides a content item into segments and provides consecutive segments to a trained machine learning model. The segments can be of different lengths and include different characters. This is because people compose at different rates and thus for a given time period, people can input various amount of content. Over a period when an entire content item is provided to a machine learning model, for a particular topic and a threshold confidence score, the topic prediction module 216 records a number of times that confidence scores associated with topic classifications for sequential segments toggle around the threshold confidence score. The topic prediction module 216 trains a score function such that a classification for the particular topic does not toggle between being relevant or irrelevant and/or such that a topic prediction for a topic does not toggle between different topics throughout different composition stages when a content item is composed. Alternatively, an empirical rule can be applied to evaluate whether topics that are classified as positive are relevant.

The topic prediction module 216 employs active training to improve a performance of trained machine learning models. Specifically, during training, the topic prediction module 216 identifies content items for which machine learning models have poor performance in classifying individual topics, in predicting topics, and/or in detecting whether existing topic predictions will change. The topic prediction module 216 provides more training data to re-train these machine learning models thereby to improve their performance. For example, the topic prediction module 216 identifies one or more features that cause disagreement in a machine learning model's topic predictions and provides training data that includes the one or more features to reduce or minimize the disagreement. As one example, the topic prediction module 216 identifies features that cause disagreement between two classifiers' topic classifications and provides posts that include the features to re-train a machine learning model including the two topic classifiers to reduce or minimize the disagreement. The topic prediction module 216 may adjust weights associated with the one or more features and/or topic classifiers such that topic classifiers with more accurate topic predictions are associated with higher weight. As another example, the topic prediction module 216 identifies topic predictions that are associated with weak confidence scores (e.g., 50%), selects those content items for experts' analysis, and provides the labeled content items as training data to re-train the topic classifiers thereby to improve their performance. The topic prediction module 216 may additionally analyze the content items to identify features that cause the weak confidence score and prompt the experts to label the specific features.

The topic prediction module 216 employs gradient training to improve trained machine learning models' performance. Specifically, the topic prediction module 216 identifies content items for which a topic classifier's output topic predictions are associated with low confidence scores. The topic prediction module 216 identifies a feature that if adjusted, the topic classifier's output topic predictions change the most. The topic prediction module 216 selects those content items for experts' analysis, and provides the labeled content items as training data to re-train the topic classifier thereby to improve its performance.

The topic store 218 stores topics. The topic store 218 may store a list of topic labels. In some embodiments, the topic store 218 may store a list of topic labels that have been used by a user. Each topic label may be associated with a rate of use by the user.

The machine learning model store 220 stores one or more machine learning models. A machine learning model may be associated with a composition stage for which it is suitable. A machine learning model may also be associated with its functionality (e.g., classification of an individual topic, topic prediction, and/or detection of whether existing topic predictions will change).

The content delivery module 222 delivers content items users. The content items may be delivered by topics. For example, the content delivery module 222 receives a request from a client device 110 for content items. In response to the request, the content delivery module 222 retrieves and provides content items to the client device 110. For instance, in some embodiments, the content delivery module 222 retrieves one or more topics from the topic store 218 and retrieves content items related to the topics from the content store 204. The content delivery module 222 organizes the retrieved content items by topics and presents the content items by topics to the client device 110.

The web server 224 links the online system 140 via the network 130 to the one or more client devices 110. The web server 224 serves web pages, as well as other web-related content, such as JAVA®, FLASH®, XML and so forth. The web server 224 may receive and route messages between the online system 140 and the client devices 110, for example, instant messages, queued messages (e.g., email), text messages, short message service (SMS) messages, or messages sent using any other suitable messaging technique. A user may send a request to the web server 224 to upload information (e.g., images or videos) that are stored in the user profile store 200. Additionally, the web server 224 may provide application programming interface (API) functionality to send data directly to native client device operating systems, such as IOS®, ANDROID™, WEBOS® or RIM®.

Example Process Flows

Figure 4:
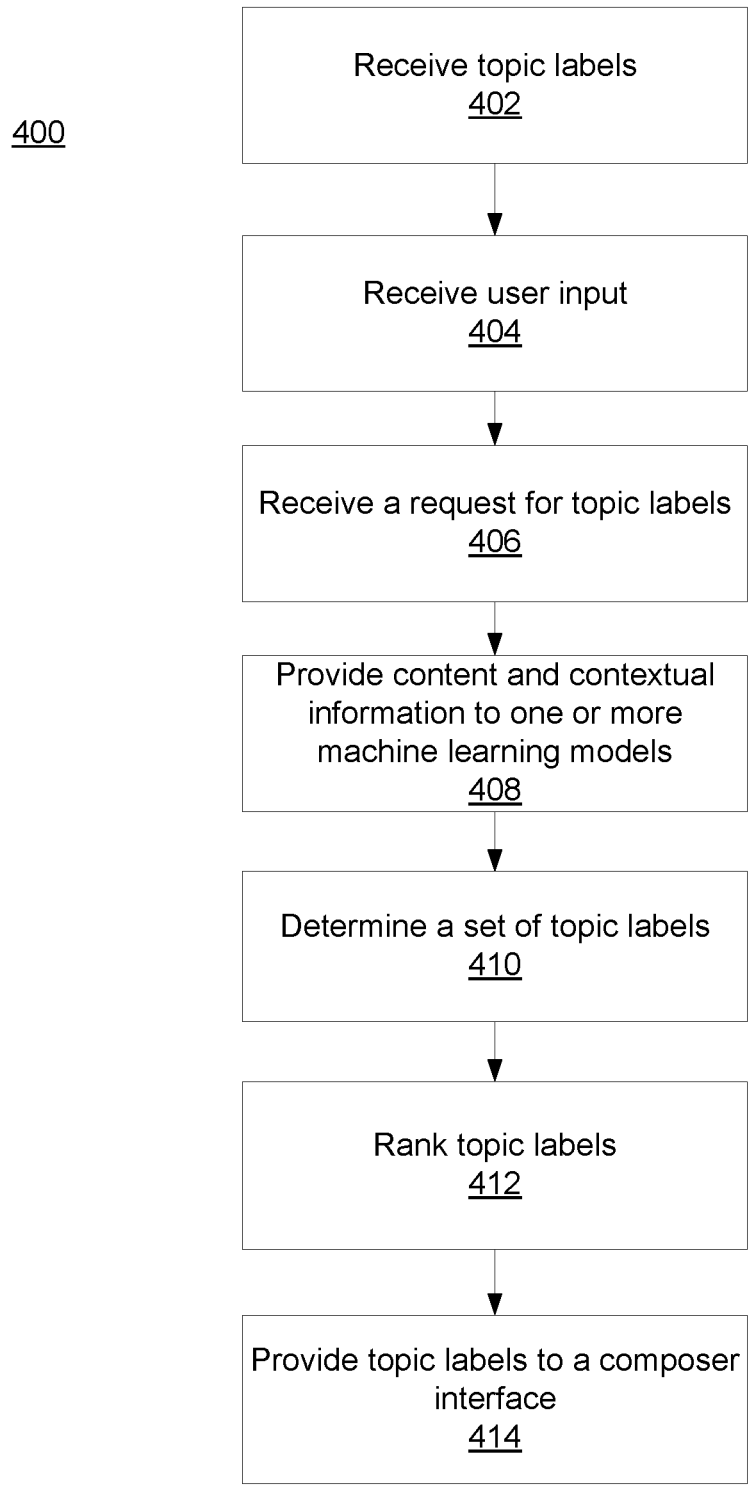
FIG. 4 is a flow diagram of determining topic labels for content items concurrently when users compose the content items according to one embodiment.

FIG. 4 is a flow diagram of determining topic labels for content items concurrently when users compose the content items according to one embodiment. In some embodiments, an online system such as the online system 140 described with reference to FIGS. 1-2 follows the process 400. The process 400 may include different, fewer, or additional steps than those described in conjunction with FIG. 4 in some embodiments or perform steps in different orders than the order described in conjunction with FIG. 4.

The online system 140 receives 402 a list of topic labels. The receiving can also include accessing a stored collection of topic labels. A topic label corresponds to one or more topics and is used for identifying topics of content items. Topic labels can be used to organize content items. For example, content items tagged by a topic label are organized into a group.

The online system 140 receives 404 user input. For example, the online system 140 provides a composer interface for receiving user input such as entering text, uploading a media content such as an image, a video, and/or an audio, pasting an URL, and/or other input. The received user input includes data describing content such as text and other media content. The composer interface may reside on a client device 110.

The online system 140 receives a request for topic labels from a composer. A request for topic labels includes information such as content input by a user and contextual information of a content item. Content included in a request can be full or partial content. Contextual information included in a request includes information that describes a context of a content item such as user information, user action, composer information, content information, content metadata, and the like. Contextual information includes topic information of a content item such as a topic label that has been determined, a topic label that has been applied, a topic label that has been removed. In response to receiving a request, the online system 140 determines topic labels as described herein and provides the determined topic labels to the composer interface. In one embodiment, the composer interface residing on the sends requests for topics at a predetermined interval (e.g., 1.5 seconds). In one embodiment, when a composer interface detects that a user adds or removes a topic label, the composer interface pauses sending requests for topics to the online system 140. The composer interface resumes sending requests for topics if the user continues composing content.

The online system 140 provides content and contextual information to one or more machine learning models, in response to receiving a request for topic labels. The online system 140 may retrieve additional contextual information from one or more of the user profile store 202, content store 204, action log 210, and edge store 212. The contextual information retrieved is provided along with the content and contextual information included in the request received to the one or more machine learning models. The one or more machine learning models may output a classification of whether an individual topic label is relevant, classifications of whether multiple individual topic labels are relevant, and/or a classification of whether existing topic predictions for a content item will change. In some embodiments, the online system 140 selects the one or more machine learning models to which the content and contextual information is provided. For example, the online system 140 selects a machine learning model based on a composition stage. As another example, the online system 140 selects a machine learning model based on a decision of whether existing topic predictions will change.

The online system 140 determines 410 a set of topic labels for suggestion to a user. The topic labels are sufficiently relevant to content items and may be selected from predetermined topic labels. The online system 140 selects topic labels based on confidence scores associated with classifications of the topic labels. In some embodiments, the one or more machine learning labels output the set of topic labels that are classified as relevant and associated with confidence scores greater than a threshold score. In some embodiments, the one or more machine learning models output classifications of topic labels, the online system 140 selects the set of topic labels based on their classifications and associated confidence scores. For different topic labels, the threshold scores used for selecting them for suggestion to a user may be different. For example, threshold scores of 0.7 and 0.8 are used for topic labels "food" and "sports" respectively. When the topic labels "food" and "sports" are each classified as being relevant and associated with a confidence score of 0.75, the topic label "food" is suggested to a user but the topic label "sports" is not. The threshold scores may be determined from a score function and selected such that the online system 140 can timely suggest sufficiently accurate topic labels to users. As described previously, the online system 140 develops the machine learning models and the score function by using training data. The training data includes content items of which topics have been identified and associated contextual information, and/or content items for which existing topic predictions will change have been detected.

The online system 140 ranks 412 the set of topic labels that are selected for suggestion to a user. For example, the topic labels selected for the user can be ranked based on associated confidence levels indicating likelihood of them being relevant to the content item. The topic labels can be presented to the user according to a ranked order. The online system 140 provides 414 the selected topic labels to a composer interface for presentation. Users can apply a topic label to content items, removing predicted topic labels, and creating topic labels.

Each topic label can include one or more sub-topic labels and each topic can include one or more sub-topics. One of ordinary skill in the art would appreciate that methods and systems of predicting topics and determining topic labels as described herein can also predict sub-topics and determine sub-topic labels.

Example Composer Interface

Figure 5:
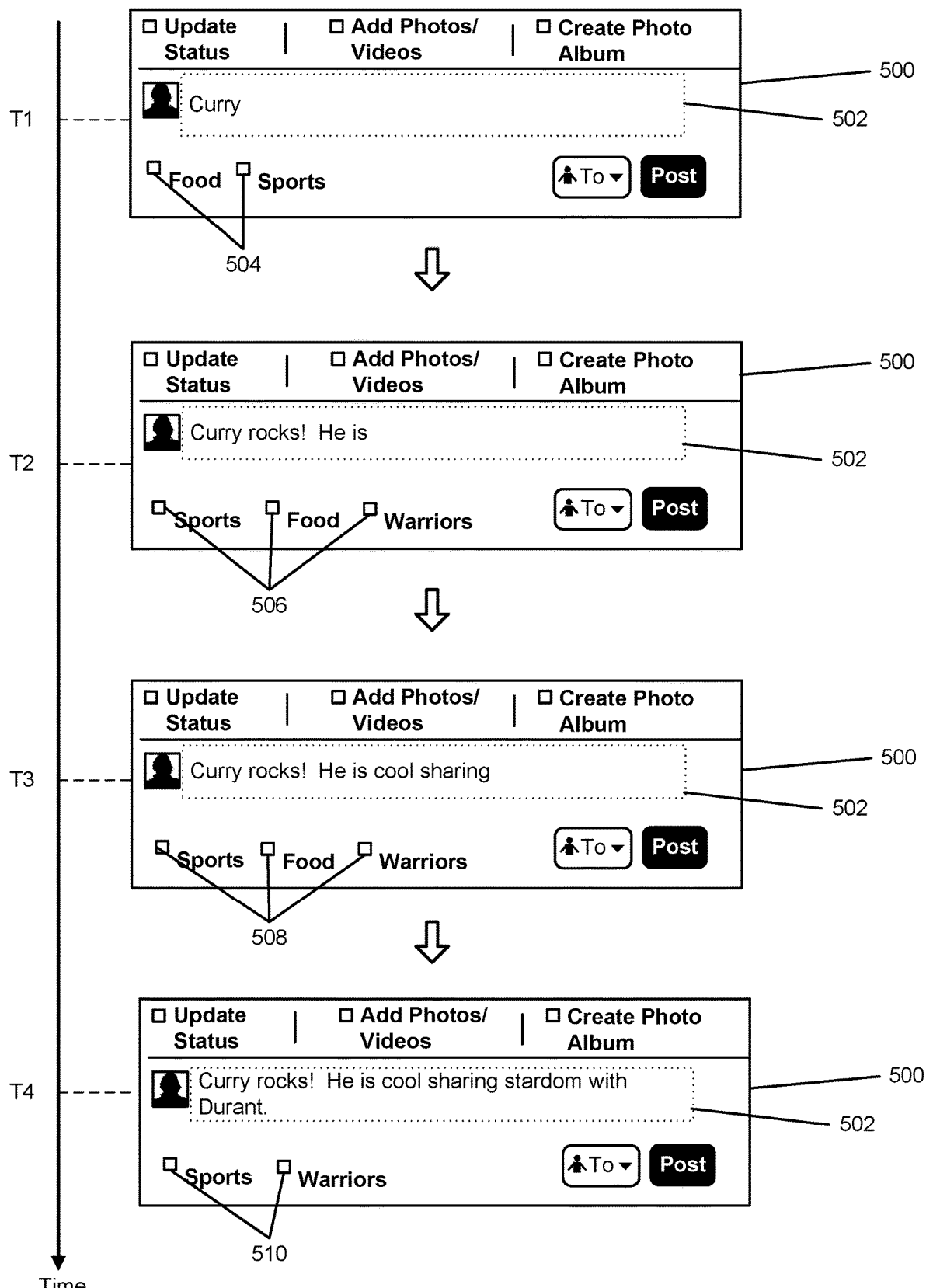
FIG. 5 illustrates an example composer interface for composing content items that includes topic label suggestions according to one embodiment.

FIG. 5 illustrates an example composer interface for composing content items that includes topic label suggestions according to one embodiment. As illustrated, the composer interface 500 includes a text entry region 502 and other composition-related icons and functions. The text entry region 502 is a text box. Input received via the composer interface 500 is communicated to the online system 140, which stores the received input.

A user creates and composes a post. The composer interface 500 sends sequential requests for topics at time points T1-T4.

At the time point T1, the user has input text "curry," and the composer interface 500 presents topic labels 504 "Food" and "Sports." The online system 140 determines that the topic labels 504 are sufficiently relevant to this post, for example, based on the content "curry" and contextual information of the post. The composer interface 500 presents the topic labels 504 according to a ranked order determined by the online system 140.

At the time point T2, the user has input text "Curry rocks! He is," and the composer interface 500 presents topic labels 506 "Sports," "Food," and "Warriors." The online system 140 determines that the topic labels 506 are sufficiently relevant to this post, for example, based on the content update "rocks! He is" and contextual information of the post. The contextual information of the post includes topic labels "Sports" and "Food" that were previously determined by the online system 140. In addition, the online system 140 determines that the topic label "Sports" is more likely to be relevant to the post than the topic label "Food" at T2, in comparison to at T1 when the topic label "Food" was determined as more likely to be relevant.

At the time point T3, the user has input text "Curry rocks! He is cool sharing," and the composer interface 500 presents topic labels 508 "Sports," "Food," and "Warriors." The online system 140 determines that it is unlikely that existing topics will change, for example, based on the content update "cool sharing" and contextual information of the post. The contextual information of the post includes topic labels "Sports," "Food," and "Warriors" that were previously determined by the online system 140. The online system 140 determines that the topic labels determined in response to the request sent at time point T2 are still sufficiently relevant.

At the time point T4, the user has input text "Curry rocks! He is cool sharing stardom with Durant," and the composer interface 500 presents topic labels 510 "Sports," "Food," and "Warriors." The online system 140 determines that it is likely that existing topic prediction ill change, for example, based on the content update "stardom with Durant" and contextual information of the post. The contextual information of the post includes topic labels "Sports," "Food," and "Warriors" that were previously determined by the online system 140. The online system 140 determines that topic labels "Sports" and "Warriors" are sufficiently relevant to the post.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, at an online system, a plurality of predetermined topic labels, each predetermined topic label corresponding to one or more topics and configured to tag content items to identify the content items by topics;
receiving, at the online system, a request for a topic prediction of a content item from a client device, the request being sent concurrently when the content item is being composed, and the request comprising content of the content item and contextual information describing a context of the content item, the contextual information including a composition stage based on a time period spent composing the content item;
predicting one or more topics of the content item in response to the request, the predicting comprising:
providing the content and the contextual information to a machine learning model corresponding to the composition stage included in the contextual information selected from a plurality of machine learning models each machine learning model corresponding ton one or more composition stages, the one or more machine learning models determining a likelihood of a predetermined topic label being relevant to the content item, and
selecting a set of predetermined topic labels from the predetermined topic labels, a likelihood of a selected predetermined topic label being relevant to the content item being greater than a threshold likelihood; and
providing for display, by the online system to the client device, the set of predetermined topic labels.

2. The computer-implemented method of claim 1, wherein the one or more machine learning models comprise a classifier corresponding to a predetermined topic label, the classifier configured to classify a likelihood of the corresponding predetermined topic label being relevant to the content item.

3. The computer-implemented method of claim 2, wherein the classifier is a binary classifier.

4. The computer-implemented method of claim 1, wherein the one or more machine learning models comprise a ensemble classifier corresponding to multiple topic labels, the ensemble classifier configured to classify likelihoods of the multiple topic labels being relevant to the content item.

5. The computer-implemented method of claim 1, wherein the contextual information comprises an existing topic prediction, and the one or more machine learning models comprise a machine learning model configured to detect if the existing topic prediction will change.

6. The computer-implemented method of claim 1, wherein the predicting further comprises: providing the content and the contextual information to a machine learning model
configured to detect if an existing topic prediction will change; and wherein the content and the contextual information is provided to the one or more
machine learning models responsive to a determination that an existing topic prediction will change.

7. The computer-implemented method of claim 1, wherein the request for topics is received periodically.

8. The computer-implemented method of claim 1, wherein the content includes all content input by the user since the user started composing the content item.

9. The computer-implemented method of claim 1, wherein the content includes content update by the user since a most recent request was sent.

10. The computer-implemented method of claim 1, wherein further comprising determining the threshold likelihood according to a score function.

11. The computer-implemented method of claim 1, further comprising: training the one or more machine learning models by training data, the training data comprising content items labeled with topic labels.

12. The computer-implemented method of claim 11, wherein the training comprises:
identifying disagreements between output topic predictions of multiple classifiers; identifying training content items and associated contextual information corresponding to
the output topic predictions having disagreements; and
providing additional training data to re-train the multiple classifiers, the additional training data comprising content items and contextual information labeled with topic labels and sharing one or more features as the training content and contextual information.

13. The computer-implemented method of claim 11, wherein the training comprises: for a machine learning model:
identifying output topic predictions associated with confidence scores lower than a threshold confidence score;
identifying training content items and associated contextual information corresponding to the identified output topic predictions;
identifying a feature of the training content item and associated contextual information that if labeled causes the output topic predictions to change the most; and
providing additional training data to re-train the machine learning model, the additional training data comprising content items and contextual information labeled with topic labels and having the identified feature.

14. The computer-implemented method of claim 1, wherein the contextual information comprises at least one of user information related to the user, a user action of the user, content information of the content item, composer information of a composer that is used by the user to compose the content item.

15. The computer-implemented method of claim 14, wherein the user information related to the user comprises at least one of an identity of the user, a current location of the user, an interest of the user, and a group associated with the user.

16. The computer-implemented method of claim 14, wherein the content information comprises a character count, a word count, a composing order, an existing topic label, a topic label that has been applied, and a topic label that has been removed.

17. The computer-implemented method of claim 14, wherein the content information of the content item comprises metadata associated with a media content included the content.

18. The computer-implemented method of claim 14, wherein the user action comprises at least one of an interaction of the user with a topic label and incorporating another content into the content.

19. The computer-implemented method of claim 14, further comprising providing, by the online system to the client device the composer for the user to compose the content item, wherein the composer information comprises a composer location of the composer within the online system.

20. The computer-implemented method of claim 1, further comprising retrieving additional contextual information and providing the additional contextual information to the one or more machine learning models.

21. The computer-implemented method of claim 1, further comprising ranking the set of predetermined topic labels according to associated likelihood of a selected predetermined topic label being relevant to the content item, wherein the set of predetermined topic labels are presented according a ranked order.

22. A non-transitory computer readable storage medium having instructions encoded thereon that, when executed by a processor, cause the processor to perform:
- receiving, at an online system, a plurality of predetermined topic labels, each predetermined topic label corresponding to one or more topics and configured to tag content items to identify the content items by topics;
- receiving, at the online system, a request for a topic prediction of a content item from a client device, the request being sent concurrently when the content item is being composed, and the request comprising content of the content item and contextual information describing a context of the content item, the contextual information including a composition stage based on a time period spent composing the content item;
- predicting one or more topics of the content item in response to the request, the predicting comprising:
  - providing the content and the contextual information to a machine learning model corresponding to the composition stage included in the contextual information selected from a plurality of machine learning models each machine learning model corresponding ton one or more composition stages, the one or more machine learning models determining a likelihood of a predetermined topic label being relevant to the content item, and
  - selecting a set of predetermined topic labels from the predetermined topic labels, a likelihood of a selected predetermined topic label being relevant to the content item being greater than a threshold likelihood; and
- providing for display, by the online system to the client device, the set of predetermined topic labels.

* * * * *